United States Patent
Gnan et al.

(10) Patent No.: US 10,618,241 B2
(45) Date of Patent: Apr. 14, 2020

(54) DEVICE FOR STORING AND REMOVING CARDBOARD FOR A BRIDGE IN A CORRUGATED CARDBOARD PRODUCTION LINE

(71) Applicant: BHS Corrugated Maschinen- und Anlagenbau GmbH, Weiherhammer (DE)

(72) Inventors: Alfons Gnan, Vilseck (DE); Robert Scharnagl, Schwarzenbach (DE); Michael Bauernfeind, Schwarzenbach (DE)

(73) Assignee: BHS Corrugated Maschinen- und Anlagenbau GmbH, Weiherhammer (DE)

(*) Notice: Subject to any disclaimer, the term of this patent is extended or adjusted under 35 U.S.C. 154(b) by 236 days.

(21) Appl. No.: 15/565,028

(22) PCT Filed: Feb. 26, 2016

(86) PCT No.: PCT/EP2016/054112
§ 371 (c)(1),
(2) Date: Oct. 6, 2017

(87) PCT Pub. No.: WO2016/162142
PCT Pub. Date: Oct. 13, 2016

(65) Prior Publication Data
US 2018/0099472 A1    Apr. 12, 2018

(30) Foreign Application Priority Data
Apr. 9, 2015   (CN) .................. 2015 2 0213017 U

(51) Int. Cl.
B29C 65/00    (2006.01)
B31F 1/28     (2006.01)
(Continued)

(52) U.S. Cl.
CPC .............. *B31F 1/2836* (2013.01); *B31F 1/28* (2013.01); *B31F 1/2813* (2013.01);
(Continued)

(58) Field of Classification Search
CPC ....... B32B 37/20; B29C 65/74; B29C 65/743; B29C 65/78; B29C 65/7841;
(Continued)

(56) References Cited

U.S. PATENT DOCUMENTS 1,914,071 A * 6/1933 Bowersock ........... B31F 1/2813
                                                      156/473
3,841,944 A * 10/1974 Harris, Jr. .......... B65H 19/1852
                                                      156/504
(Continued)

*Primary Examiner* — Mark A Osele
*Assistant Examiner* — Nickolas R Harm
(74) *Attorney, Agent, or Firm* — McGlew and Tuttle, P.C.

(57) ABSTRACT

A device for cardboard storage and removal for a bridge in a corrugated cardboard production line includes a bridge over which a conveyor system for conveying the single-sided laminated corrugated cardboard web is arranged. The exit end of the conveyor system for conveying the single-sided laminated corrugated cardboard web is provided with a clamping and cutting unit and a movable cardboard storage carriage unit is provided under the conveyor system for conveying the single-sided laminated corrugated cardboard web, under which conveyor system a conveyor belt system is provided in the bridge, and in the bridge an opening is provided, under which a waste cardboard collecting carriage is provided. The movable cardboard storage carriage unit stores the cardboard by means of cardboard storage rolls, which retain the single-sided laminated corrugated cardboard web flat on the bridge. In the event that a splicing defect is detected, the defective piece is cut out by the clamping and cutting unit and ejected by the conveyor belt system to the waste cardboard collecting carriage through the opening. Hence, it follows that productivity is improved.

11 Claims, 12 Drawing Sheets

(51) Int. Cl.
| | |
|---|---|
| *B65H 20/06* | (2006.01) |
| *B65H 21/00* | (2006.01) |
| *B65H 23/04* | (2006.01) |
| *B65H 26/02* | (2006.01) |
| *B29C 65/78* | (2006.01) |
| *B65H 16/02* | (2006.01) |
| *B65H 19/14* | (2006.01) |
| *B29C 65/74* | (2006.01) |
| *B65H 19/20* | (2006.01) |
| *B65H 19/18* | (2006.01) |
| *B32B 37/20* | (2006.01) |
| *B65H 19/10* | (2006.01) |

(52) U.S. Cl.
CPC .......... *B31F 1/2822* (2013.01); *B31F 1/2831* (2013.01); *B65H 20/06* (2013.01); *B65H 21/00* (2013.01); *B65H 23/048* (2013.01); *B65H 26/02* (2013.01); *B29C 65/74* (2013.01); *B29C 65/78* (2013.01); *B29C 65/7841* (2013.01); *B29C 65/7873* (2013.01); *B29C 65/7894* (2013.01); *B29C 66/004* (2013.01); *B29C 66/006* (2013.01); *B29C 66/43* (2013.01); *B29C 66/8124* (2013.01); *B29C 66/83421* (2013.01); *B29C 66/853* (2013.01); *B31F 1/2804* (2013.01); *B31F 1/2818* (2013.01); *B32B 37/20* (2013.01); *B65H 16/021* (2013.01); *B65H 19/102* (2013.01); *B65H 19/14* (2013.01); *B65H 19/18* (2013.01); *B65H 19/20* (2013.01); *B65H 2701/1762* (2013.01)

(58) Field of Classification Search
CPC ............ B29C 65/7873; B29C 65/7894; B29C 66/004; B29C 66/006; B29C 66/43; B29C 66/8124; B29C 66/83421; B29C 66/853; B31F 1/2822; B31F 1/2836; B65H 16/021; B65H 19/102; B65H 19/14; B65H 19/18; B65H 19/20; B65H 20/06; B65H 21/00; B65H 23/048
USPC .... 156/251, 267, 304.1, 324, 391, 504, 510, 156/576, 577
See application file for complete search history.

(56) References Cited

U.S. PATENT DOCUMENTS

| | | | |
|---|---|---|---|
| 4,266,998 A | 5/1981 | Tokuno | |
| 4,288,273 A | 9/1981 | Butler, Jr. et al. | |
| 4,566,922 A | 1/1986 | Martinez | |
| 5,049,222 A * | 9/1991 | Irie | B29D 30/3007 156/123 |
| 2006/0148631 A1* | 7/2006 | Protocsnak | B31F 1/2822 493/463 |
| 2014/0000785 A1* | 1/2014 | Gnan | B31F 1/20 156/64 |
| 2015/0291380 A1* | 10/2015 | Fischer | B65H 19/1805 242/552 |
| 2017/0087900 A1* | 3/2017 | Mark | B41J 15/04 |

\* cited by examiner

US 10,618,241 B2

DEVICE FOR STORING AND REMOVING CARDBOARD FOR A BRIDGE IN A CORRUGATED CARDBOARD PRODUCTION LINE

CROSS REFERENCE TO RELATED APPLICATIONS

This application is a United States National Phase Application of International Application PCT/EP2016/054112 filed Feb. 26, 2016 and claims the benefit of priority under 35 U.S.C. § 119 of Chinese Patent Application CN 2015 2021 3017.5 filed on Apr. 9, 2015, the entire contents of which are incorporated herein by reference.

FIELD OF THE INVENTION

The invention concerns a machine, in particular with a corrugated cardboard processing device and in particular with a device for storing and removing cardboard for a bridge in a corrugated cardboard production line. The invention also concerns a corresponding method.

BACKGROUND OF THE INVENTION

A single-sided laminated corrugated cardboard web of a corrugated cardboard production line is stored in a loop on a bridge which produces folding or marking on the surface of the cardboard web. Furthermore, splicing errors or other rejects which accumulate on the bridge cannot be removed in a convenient and timely manner which adversely affects productivity.

SUMMARY OF THE INVENTION

The task of the invention consists of producing a device for the storage and removal or disposal of cardboard for a bridge in a corrugated cardboard production line in order to solve the existing problems wherein the single-sided laminated corrugated cardboard web is folded on the bridge and the rejects on the bridge cannot be removed in a convenient and timely manner. The intention also is to create a corresponding method.

This task is resolved by a device for cardboard storage and removal for a bridge in a corrugated cardboard production line, comprising a bridge with a planar surface on the upper side, wherein a conveyor system for conveying a single-sided laminated corrugated cardboard web is arranged above the bridge, said system comprising a conveyor belt, running parallel to the planar surface, for conveying the single-sided laminated corrugated cardboard web and has an entry end and an exit end where a clamping and cutting unit is provided, a first cardboard guide roll and a second cardboard guide roll, which are arranged with a vertical gap between them, are provided outside of the exit end of the conveyor system for conveying the single-sided laminated corrugated cardboard web, a separating plate, which runs parallel to the direction of travel of the conveyor belt for conveying the single-sided laminated corrugated cardboard web, is provided below the conveyor system for conveying the single-sided laminated corrugated cardboard web, a movable cardboard storage carriage unit is provided on the bridge under the conveyor system for conveying the single-sided laminated corrugated cardboard web to form a sliding pair with the bridge, and a drive system is connected to the movable cardboard storage carriage unit, which comprises a first cardboard storage roll and a second cardboard storage roll, which are arranged with a vertical gap between them, the first cardboard guide roll, the first cardboard storage roll, the second cardboard guide roll and the second cardboard storage roll are arranged one after the other along the vertical direction with a vertical gap between each of them, a conveyor belt system is provided in the bridge under the movable cardboard storage carriage unit, an opening is provided in the bridge adjacent to one end of the conveyor belt system, and a flap, under which a waste cardboard collecting carriage is provided, is provided in the opening. Furthermore, this task is resolved by a method for cardboard storage and removal for a bridge in a corrugated cardboard production line, comprising the provision of a device according to the invention.

A device for cardboard storage and removal for a bridge in a corrugated cardboard production line according to the invention comprises a bridge with a planar surface on the upper side, wherein a conveyor system for conveying a single-sided laminated corrugated cardboard web, which comprises a conveyor belt running parallel to the planar surface conveying the single-sided laminated corrugated cardboard web, is arranged above the bridge.

Insofar as the term "cardboard" is used, this is preferably intended to mean corrugated cardboard. The single-sided laminated corrugated cardboard web is preferably continuous. Advantageously, it has a smooth liner web/laminating web and a fluted cardboard web which are glued together.

The conveyor system for conveying the single-sided laminated corrugated cardboard web has an entry end and an exit end where a clamping and cutting unit is provided. Advantageously, the clamping and cutting unit has a clamping part and a cutting part associated with the single-sided laminated corrugated cardboard web, wherein said parts can be operated or, as the case may be, displaced preferably independently of each other.

Outside of or downstream from the exit end of the conveyor system for conveying the single-sided laminated corrugated cardboard web, a first cardboard guide roll and a second cardboard guide roll are provided which are aligned or arranged with a vertical gap between each other.

A separating plate running parallel to the direction of travel of the conveyor belt for conveying the single-sided laminated corrugated cardboard web is provided under the conveyor system for conveying the single-sided laminated corrugated cardboard web.

A movable or displaceable cardboard storage carriage unit is provided on the bridge under the conveyor system for conveying the single-sided laminated corrugated cardboard web to form a sliding pair with the bridge.

A drive system is connected to the movable cardboard storage carriage unit which comprises a first cardboard storage roll and a second cardboard storage roll, which are aligned or arranged with a vertical gap between each other.

The first cardboard guide roll, the first cardboard storage roll, the second cardboard guide roll and the second cardboard storage roll are arranged in a vertical direction one after the other with a vertical gap between each other.

A conveyor belt arrangement is provided in the bridge under the movable cardboard storage carriage unit, wherein an opening in the bridge is also provided adjacent to one end of it.

A flap, under which a waste cardboard collecting carriage is located, is provided in/near the opening.

Advantageously, the conveyor belt of the conveyor system for conveying the single-sided laminated corrugated cardboard web is continuous. Preferably it is driven. It is able, in particular, to convey the single-sided laminated corrugated cardboard web to the clamping and cutting unit. Preferably, the conveyor belt conveys the single-sided laminated corrugated cardboard web from a guide frame means to the clamping and cutting unit.

The first cardboard guide roll and the second cardboard guide roll are each mounted advantageously so that they rotate. In particular, they are able to guide, or redirect the single-sided laminated corrugated cardboard web. It is advantageous if the first and/or second cardboard guide roll is/are fixed in place, meaning, in particular, that they cannot be displaced perpendicularly to their rotational axis.

The separating plate preferably has an unbroken surface. Alternatively, it is perforated by at least one opening. It is expedient if the separating plate is designed to be level. Alternatively, it is not level. During use, the separating plate is able, in particular, to prevent a first section of the single-sided laminated corrugated cardboard web conveyed by the conveyor system for conveying the single-sided laminated corrugated cardboard web and a second section of the single-sided laminated corrugated cardboard web conveyed in the conveyor belt system from contacting each other, which can result in damage to them, or damage to the single-sided laminated corrugated cardboard web. The separating plate thus serves as a spatial separation between these sections. This applies, in particular, when driving the device for cardboard storage and removal.

The cardboard storage carriage unit advantageously forms a partner. It comprises the cardboard storage rolls, which, in particular, are each mounted there to rotate. By displacing the cardboard storage carriage unit, the cardboard storage rolls are also displaceable, so to speak.

The conveyor belt system comprises, advantageously, a continuous conveyor belt. The conveyor belt system serves to convey the single-sided laminated corrugated cardboard web, in particular, the usable and faulty parts of the single-sided laminated corrugated cardboard web. Relative to the conveying direction of the single-sided laminated corrugated cardboard web, said belt is arranged preferably downstream of the conveyor system for conveying the single-sided laminated corrugated cardboard web.

The conveyor belt of the conveyor belt system can be driven advantageously forwards and backwards. Thus, it is possible to eject an individual piece of the single-sided laminated corrugated cardboard web.

The opening is advantageously arranged laterally next to the conveyor belt system. It extends preferably in a horizontal plane.

It is advantageous if the flap can be pivoted about a horizontal pivot axis, in particular. Advantageously, the flap can be moved between an open position and a closed position. In the open position of the flap, the opening is preferably open, whereas in the closed position, the flap advantageously closes the opening. Preferably, in the open position, defective cardboard can be ejected through the opening.

The waste cardboard collecting carriage can be designed in any manner. Preferably it has wheels to support it from the ground, as well as a base.

Alternatively, it is designed without wheels. The waste cardboard collecting carriage may or may not have its own drive.

The working principle of the present embodiment is as follows: the entry end of the conveyor system for conveying the single-sided laminated corrugated cardboard web is arranged adjacent to the exit from the production machine for producing the single-sided laminated corrugated cardboard web which issues the single-sided laminated corrugated cardboard web; the single-sided laminated corrugated cardboard web issued from the production machine for producing the single-sided laminated corrugated cardboard web is transported to the conveyor belt for conveying the single-sided laminated corrugated cardboard web by an inclined guide frame means and the single-sided laminated corrugated cardboard web is transported by the conveyor belt for conveying the single-sided laminated corrugated cardboard web to the exit end of the conveyor system for conveying the single-sided laminated corrugated cardboard web and is transported further to the conveyor belt system, after which it is run through the clamping and cutting unit.

The movable cardboard storage carriage unit moves horizontally from the exit end to the entry end of the conveyor system for conveying the single-sided laminated corrugated cardboard web, wherein, in order to provide the storage for the cardboard, the first cardboard storage roll and the second cardboard storage roll in the movable cardboard storage carriage unit feed the single-sided laminated corrugated cardboard web in turn around the first cardboard guide roll, the first cardboard storage roll, the second cardboard guide roll and the second cardboard storage roll.

When the movable cardboard storage carriage unit reaches the limit of its path, the stored single-sided laminated corrugated cardboard web reaches its maximum length.

Because of the separating plate, the corrugated tips of the single-sided laminated corrugated cardboard web are protected from damage and the single-sided laminated corrugated cardboard web itself is not damaged in the event that the production machine for producing the single-sided laminated corrugated cardboard web is started up again.

If a detection means detects a splicing defect or other defective pieces, the clamping and cutting unit is started to prevent the further transportation of the single-sided laminated corrugated cardboard web. In the meantime, the control system commands the movable cardboard storage carriage unit to return to the exit end of the conveyor system for conveying the single-sided laminated corrugated cardboard web, and the single-sided laminated corrugated cardboard web is cut by the clamping and cutting unit into two pieces.

Because of the difference in speeds between the conveyor belt for conveying the single-sided laminated corrugated cardboard web and the production machine for producing the single-sided laminated corrugated cardboard web, the defective or damaged piece of the single-sided laminated corrugated cardboard web, which did not run through the clamping and cutting unit, is left on the conveyor belt for conveying the single-sided laminated corrugated cardboard web where it forms a loop, whereas the usable piece, which ran through the clamping and cutting unit, runs through the movable cardboard storage carriage unit and leaves the conveyor belt system.

Then the control system changes the conveying direction of the conveyor belt system and simultaneously releases the clamping and cutting unit. The defective piece of the single-sided laminated corrugated cardboard web, which has remained on the conveyor belt for conveying the single-sided laminated corrugated cardboard web, moves forward with the conveyor belt for conveying the single-sided laminated corrugated cardboard web. Because of the change in the conveying direction of the conveyor belt system, the defective piece of the single-sided laminated corrugated cardboard web is conveyed to the position of the flap and is transported through the opening to the waste cardboard collecting carriage which is arranged under the opening.

After the entire defective piece of the single-sided laminated corrugated cardboard web has gone through the clamping and cutting unit, the control system starts up the clamping and cutting unit again in order to cut off the single-sided laminated corrugated cardboard web, and, after the defective piece has been loaded finally into the waste cardboard collecting carriage, the control system changes the conveying direction of the conveyor belt system again, and the usable single-sided laminated corrugated cardboard web is released from the production machine for producing the single-sided laminated corrugated cardboard web by the clamping and cutting unit, transported by the movable cardboard storage carriage unit and then joined to an earlier usable single-sided laminated corrugated cardboard web. And then the movable cardboard storage carriage unit is transported further to perform the storage function.

Compared with the state of the art, the technical effect of the present invention is positive and significant. According to the present invention, a conveyor system for conveying the single-sided laminated corrugated cardboard web, a movable cardboard storage carriage unit and a clamping and cutting unit are present on the bridge outside the exit from the production machine for producing the single-sided laminated corrugated cardboard web, and a conveyor belt system, whose conveying direction can be changed, an opening, and a waste cardboard collecting carriage are provided under the conveyor system for conveying the single-sided laminated corrugated cardboard web.

The movable cardboard storage carriage unit stores the cardboard by means of cardboard storage rolls and the single-sided laminated corrugated cardboard web can be kept flat on the bridge. If a splicing defect is established, the defective piece is cut out by the clamping and cutting unit and the waste is ejected by the conveyor belt system through the opening to the waste cardboard collecting carriage, which improves productivity.

Furthermore, the conveyor belt system comprises a forward and reverse drive system. The conveyor belt can be driven in a first and also in an opposite second direction.

The splicing device is advantageously telescopic, hinged and/or pivotable.

Advantageously, a catwalk ends or runs adjacent to the splicing device in order to provide easy access to the splicing device.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
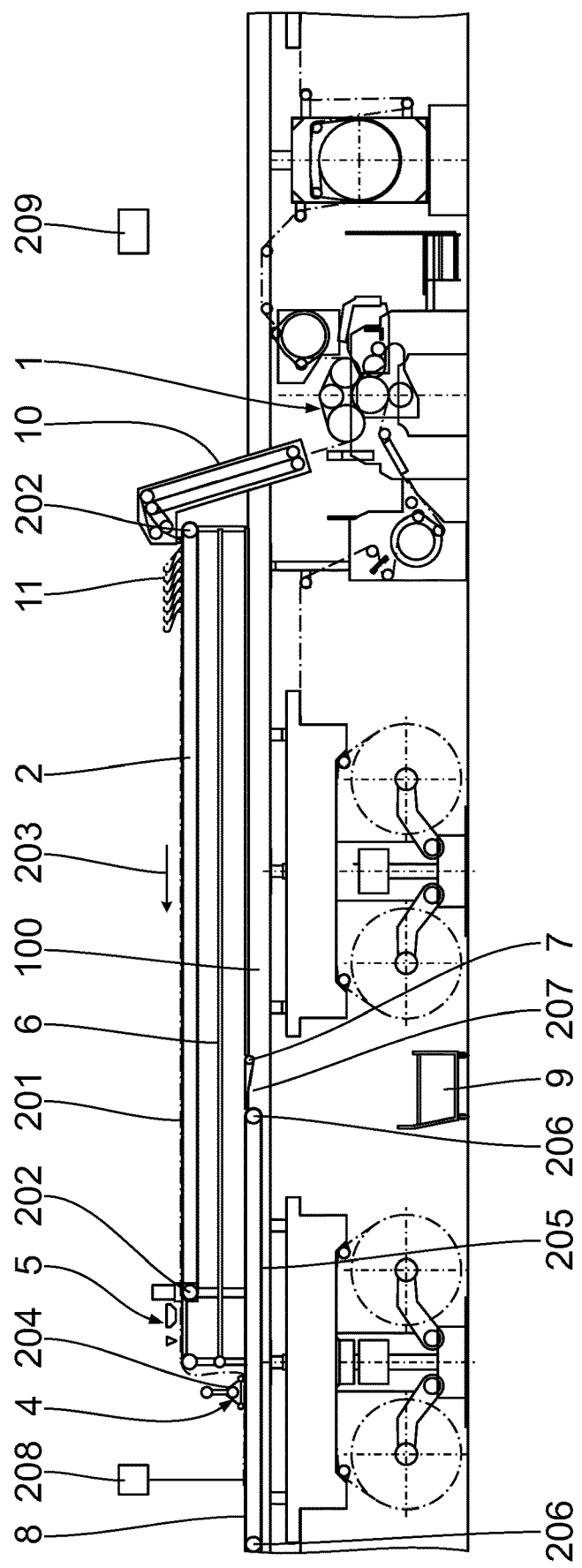
FIG. 1 is a diagrammatic view of the device for cardboard storage and removal for a bridge in the corrugated cardboard production line of the present invention.
Figure 2:
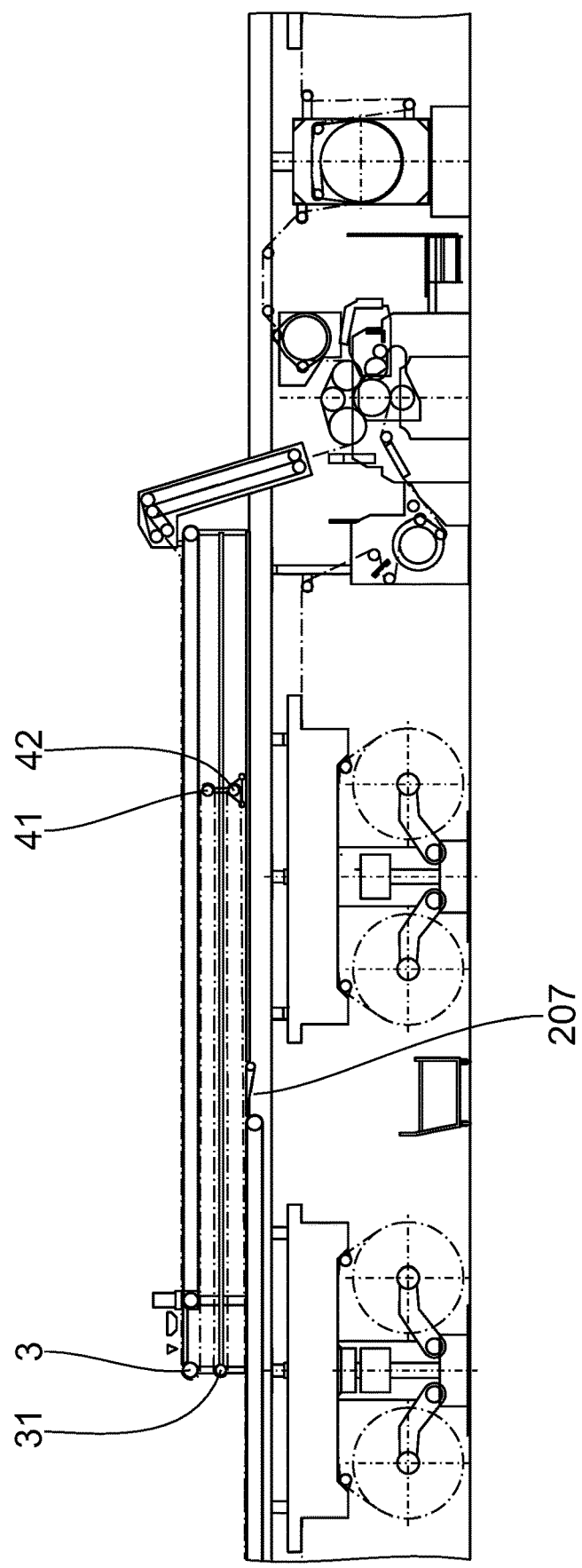
FIG. 2 is a diagrammatic view of the operating principle of the movable cardboard storage carriage unit in the device for cardboard storage and removal for a bridge in the corrugated cardboard production line of the present invention.

Referring to FIGS. 1 and 2, the device for cardboard storage and removal for a bridge in the corrugated cardboard production line according to the present invention comprises a bridge 100, which has a planar surface on the top side, wherein above said bridge a conveyor system 2 for conveying a single-sided laminated corrugated cardboard web is arranged which comprises a conveyor belt running parallel to the planar surface conveying the single-sided laminated corrugated cardboard web.

The conveyor system 2 for conveying the single-sided laminated corrugated cardboard web has an entry end and an exit end, wherein the exit end is equipped with a clamping and cutting unit 5.

A first cardboard guide roll 3 and a second cardboard guide roll 31 are arranged outside of or downstream from the exit end of the conveyor system for conveying the single-sided laminated corrugated cardboard web and are aligned or arranged with a vertical gap between each other.

A separating plate 6 is arranged under the conveyor system 2 for conveying the single-sided laminated corrugated cardboard web and extends parallel to the direction of travel of the conveyor belt for conveying the single-sided laminated corrugated cardboard web.

A movable cardboard storage carriage unit 4 is arranged under the conveyor system 2 for conveying the single-sided laminated corrugated cardboard web and on the bridge 100, forming a sliding pair with the bridge 100.

The movable cardboard storage carriage unit 4 is connected to a drive system and comprises a first cardboard storage roll 41 and the second cardboard storage roll 42, which are aligned or arranged with a vertical gap between them. The first cardboard guide roll 3, the first cardboard storage roll 41, the second cardboard guide roll 31 and the second cardboard storage roll 42 are arranged, one after the other, in a vertical direction with a vertical gap between one another.

A conveyor belt system 8 is provided in the bridge 100 under the movable cardboard storage carriage unit 4 and an opening arranged adjacent to one end of the conveyor belt system 8 is also provided in/on the bridge 100.

A flap 7 is provided in the opening and a waste cardboard collecting carriage 9 is provided under the flap 7.

Furthermore, the conveyor belt system 8 has a forward and reverse drive system.

The conveyor belt 201 of the conveyor system 2 is continuous around its periphery and is guided around two redirecting rolls 202 arranged with a gap between one another. It operates in a circulating or conveying direction 203 along which the single-sided laminated corrugated cardboard web 11 is conveyed in the horizontal to the clamping and cutting unit 5.

The first cardboard guide roll 3 is arranged downstream of the conveyor system 2 and with a gap from it and relative to the conveying direction 203 of the single-sided laminated corrugated cardboard web 11 on the conveyor belt 201. Preferably, the axes of the first cardboard guide roll 3 and the redirecting rolls 202 lie essentially in a common plane which runs advantageously horizontally.

The second cardboard guide roll 31 is arranged under the first cardboard guide roll 3 and with a gap from it. The cardboard guide rolls 3, 31 or their axes lie in a vertical plane.

The separating plate 6 extends horizontally under the conveyor system 2. It extends from the entry side redirecting roll 202 to the second cardboard guide roll 31. The separating plate 6 and the second cardboard guide roll 31 lie essentially in a common horizontal plane. The width of the separating plate 6 advantageously corresponds to at least the width of the single-sided laminated corrugated cardboard web 11 in its lateral direction.

The cardboard storage carriage unit 4 is displaceable horizontally. This is performed by the drive system 204, which, for example, has a drive incorporated in the cardboard storage carriage unit 4, or an external drive, which is preferably connected directly or indirectly to the cardboard storage carriage unit 4 by a driving means, such as a cable, belt, rod, chain or similar. The cardboard storage carriage unit 4 is advantageously controlled.

The first cardboard storage roll 41 of the cardboard storage carriage unit 4 is arranged above a plane including the separating plate 6, while the second cardboard storage roll 42 of the cardboard storage carriage unit 4 is arranged under this plane. The cardboard storage rolls 41, 42 or their axes lie in a vertical plane.

The conveyor belt system 8 is arranged under the cardboard storage carriage unit 4. The conveyor belt 205 of the conveyor belt system 8 is continuous. It is guided around redirecting rolls 206 and extends laterally beyond a vertical plane which includes the cardboard guide rolls 3, 31. The conveyor belt 205 extends laterally on both sides beyond a splicing device which will be described in more detail below.

The axes of the redirecting rolls 202, 206, the cardboard guide rolls 3, 31 and the cardboard storage rolls 41, 42 each run horizontally and parallel to each other.

The opening 207 formed in the bridge 100 is located laterally next to the conveyor belt system 8. It is also located under the travel path of the cardboard storage carriage unit 4. The flap 7 is mounted in/on the bridge 100 so that it pivots. The flap 7 is displaceable about a horizontal pivot axis which runs parallel to the redirecting rolls 206. The flap 7 fits the opening 207. In its closed position, the flap 7 extends horizontally and closes the opening 207. In its open position, the flap 7 is deflected out of the horizontal and leaves the opening 207 open.

The forward and reverse drive system 208 is able to drive the conveyor belt 205 either forward or in the reverse direction. The forward and reverse drive system 208 is connected to the conveyor belt system 8.

The device for cardboard storage and removal has the control system 209.

Figure 3:
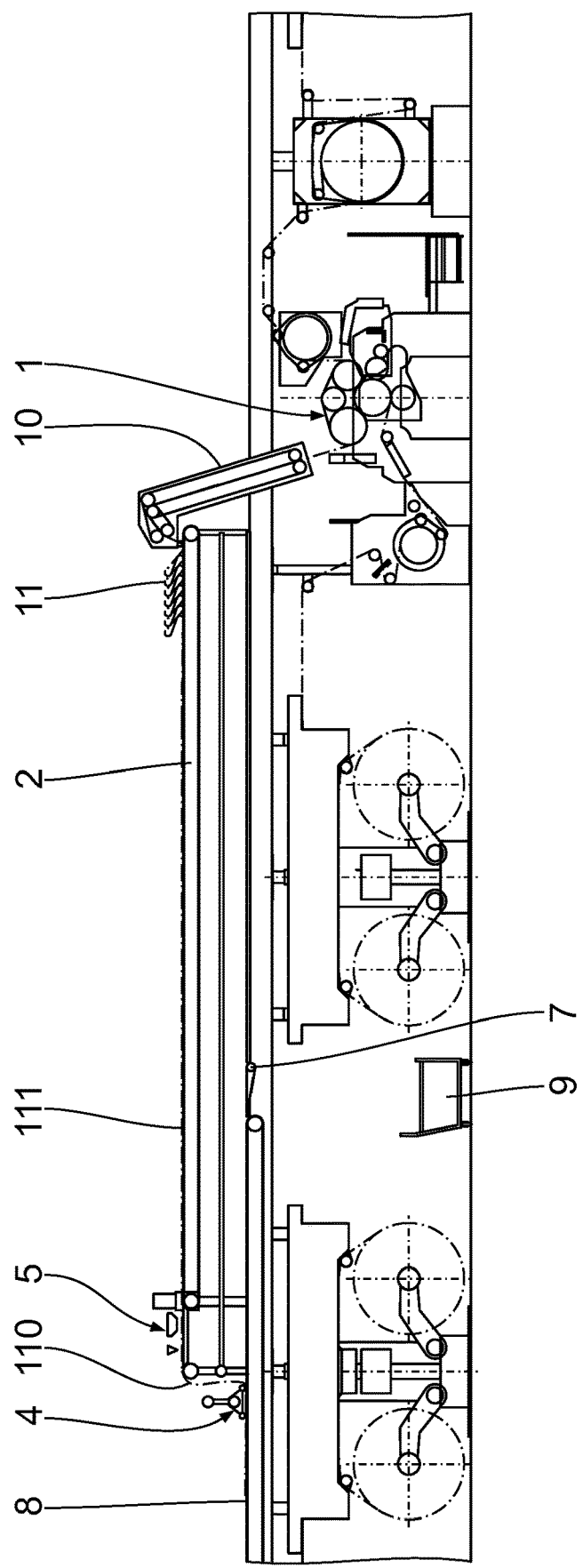
FIG. 3 is a diagrammatic view illustrating the severing of the leading end of the defective piece of the single-sided laminated corrugated cardboard web in the device for cardboard storage and removal for a bridge in the corrugated cardboard production line of the present invention.
Figure 4:
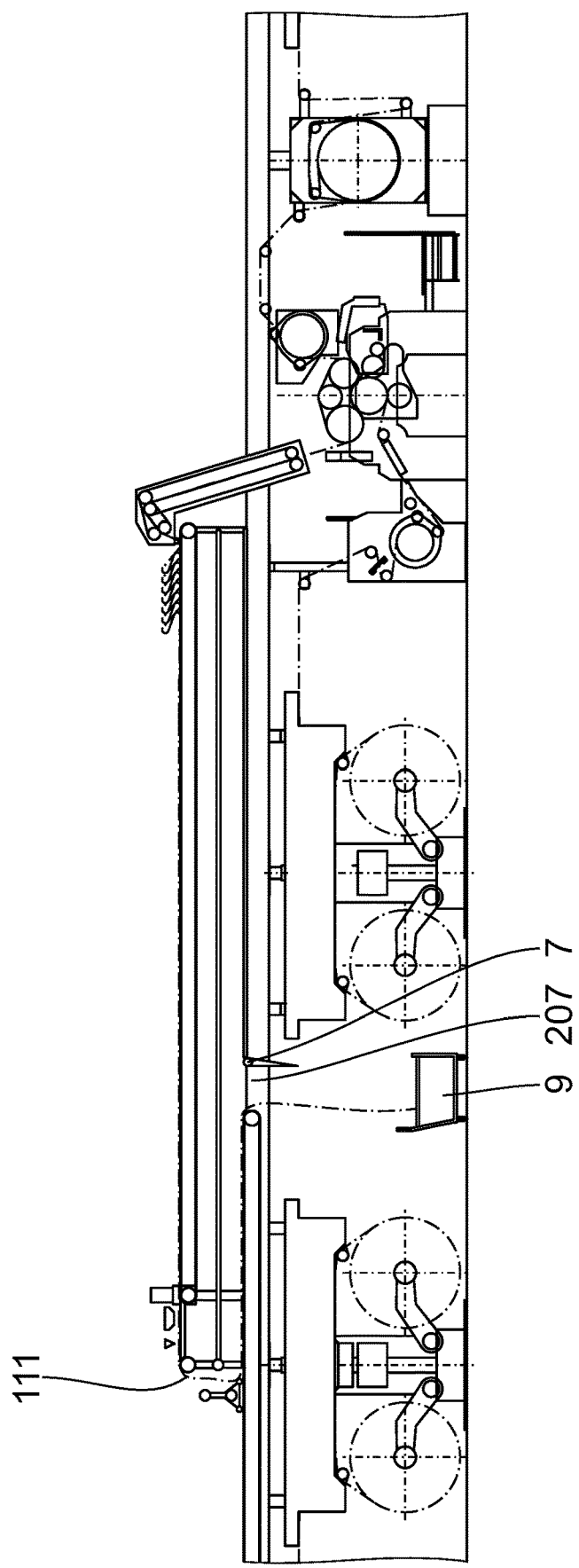
FIG. 4 is a diagrammatic view illustrating the discharge of the defective piece the single-sided laminated corrugated cardboard web to the device for cardboard storage and removal for a bridge in the corrugated cardboard production line of the present invention.
Figure 5:
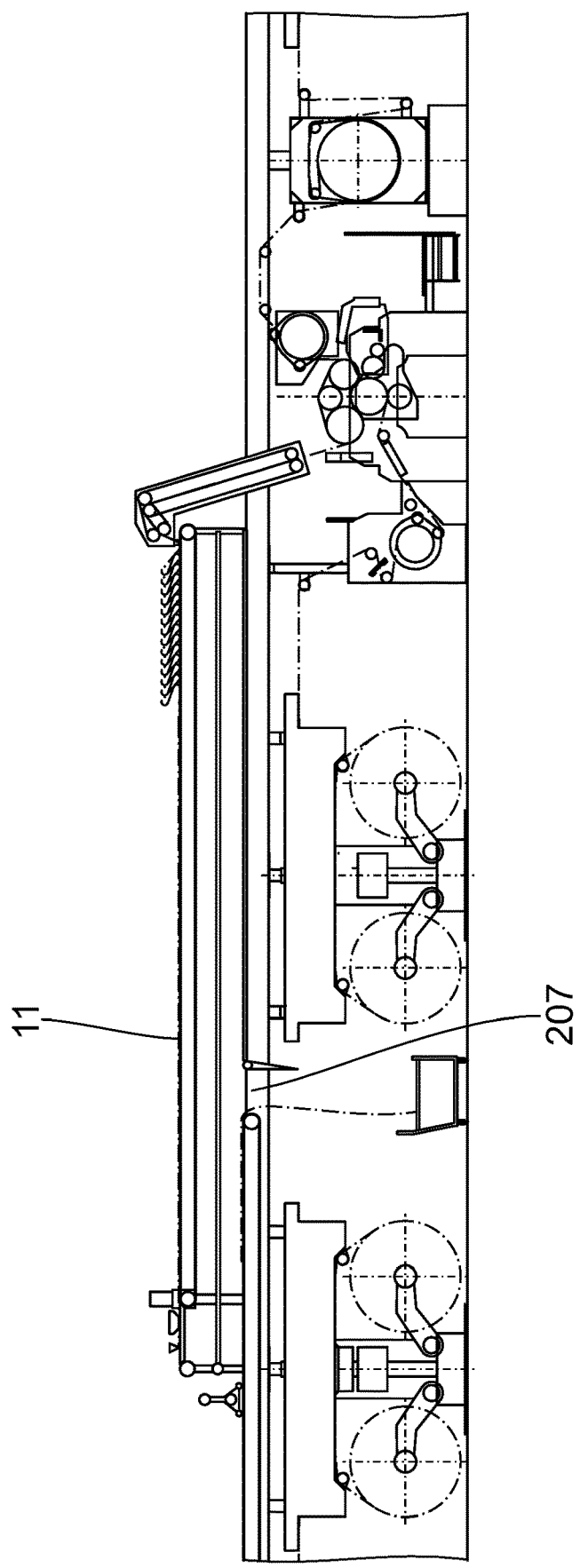
FIG. 5 is a diagrammatic view showing a section through the trailing end of the defective piece of the single-sided laminated corrugated cardboard web in the device for cardboard storage and removal for a bridge in the corrugated cardboard production line of the present invention.

As can be seen in FIGS. 3, 4 and 5, the operating principle of the present embodiment is as follows: the entry end of the conveyor system 2 for conveying the single-sided laminated corrugated cardboard web is arranged adjacent to the exit of the production machine 1 for producing the single-sided laminated corrugated cardboard web, which issues the single-sided laminated corrugated cardboard web; the single-sided laminated corrugated cardboard web 11 issued from the production machine 1 for producing the single-sided laminated corrugated cardboard web is transported to the conveyor belt for conveying the single-sided laminated corrugated cardboard web by an inclined guide frame means 10 and the single-sided laminated corrugated cardboard web 11 is transported by the conveyor belt for conveying the single-sided laminated corrugated cardboard web to the exit end of the conveyor system 2 for conveying the single-sided laminated corrugated cardboard web and is transported further to the conveyor belt system 8, after which it is run through the clamping and cutting unit 5. The inclined guide frame means 10 is designed for transporting upwards.

The movable cardboard storage carriage unit 4 moves horizontally from the exit end to the entry end of the conveyor system 2 for conveying the single-sided laminated corrugated cardboard web in order to provide the storage for the cardboard, the first cardboard storage roll 41 and the second cardboard storage roll 42 in the movable cardboard storage carriage unit 4 feed the single-sided laminated corrugated cardboard web 11 in turn around the first cardboard guide roll 3, the first cardboard storage roll 41, the second cardboard guide roll 31 and the second cardboard storage roll 42. This process is shown in FIGS. 1, 2. By running the cardboard storage carriage unit 4 by means of the associated drive system 204 towards the guide frame means 10 or, respectively, the entry end of the conveyor system 2, the length of the stored, single-sided laminated corrugated cardboard web 11 gradually increases. This is attributed to the fact that the single-sided laminated corrugated cardboard web 11 is now also being guided around the cardboard storage rolls 41, 42 of the cardboard storage carriage unit 4, which is moving away from the cardboard guide rolls 3, 31 and, in doing so, the single-sided laminated corrugated cardboard web 11 is stored as it is being carried along. The single-sided laminated corrugated cardboard web 11 thus runs several times back and forth or in a meandering fashion, in the device for cardboard storage and removal, which results in an increased length of the single-sided laminated corrugated cardboard web 11 in the device for cardboard storage and removal.

When the movable cardboard storage carriage unit 4 reaches the limit of its path, the stored, single-sided laminated corrugated cardboard web 11 reaches its maximum length. Compared with FIG. 2, the movable cardboard storage carriage unit 4 is then moved even further towards the guide frame means 10. Then, the cardboard storage carriage unit 4 is arranged adjacent to the guide frame means 10.

The single-sided laminated corrugated cardboard web 11 then has sections running parallel to each other in the device for cardboard storage and removal, wherein said sections are arranged with gaps between each other, or one behind the other, in the conveying direction of the single-sided laminated corrugated cardboard web 11. The separating plate 6 is thus located between two sections of the single-sided laminated corrugated cardboard web 11, according to which their corrugated webs are facing each other or, respectively, their liner webs/laminating webs are facing away from each other. Because of the separating plate 6, the corrugated tips of the single-sided laminated corrugated cardboard web 11 are protected from damage and the single-sided laminated corrugated cardboard web 11 itself is not damaged in the event that the production machine 1 for producing the single-sided laminated corrugated cardboard web is started up again. In particular, the separating plate 6 thus prevents the corrugated tips of the one section of the single-sided laminated corrugated cardboard web 11 from lying in corresponding corrugated valleys of the adjacent section of the single-sided laminated corrugated cardboard web 11 which can cause damage to the single-sided laminated corrugated cardboard web 11 or can result in disruption of production.

When the cardboard storage carriage unit 4 is moved back again towards the exit end of the conveyor system 2, this causes the length of the corrugated cardboard web 11 stored in the device for cardboard storage and removal to shorten again until it reaches its minimum when the cardboard storage carriage unit 4 is no longer redirecting the single-sided laminated corrugated cardboard web 11.

If the detection means detects a splicing defect or other defective pieces, the clamping and cutting unit 5 is started to prevent the further transportation of the single-sided laminated corrugated cardboard web 11. The clamping and cutting unit 5 thus brings the single-sided laminated corrugated cardboard web 11 to a halt. This is performed by firmly clamping the single-sided laminated corrugated cardboard web 11 at the clamping and cutting unit 5. In the meantime, the control system 209 commands the movable cardboard storage carriage unit 4 to return to the exit end of the conveyor system 2 for conveying the single-sided laminated corrugated cardboard web, and the single-sided laminated corrugated cardboard web 11 is cut by the clamping and cutting unit 5 into two pieces 110 and 111. In doing so, the length of the single-sided laminated corrugated cardboard web 11 stored in the device for cardboard storage and removal is reduced again until it reaches its minimum when the cardboard storage rolls 41, 42 no longer redirect the single-sided laminated corrugated cardboard web 11.

Next, the speed of the conveyor system 2 is reduced by the control system 209. It is reduced to about 5% to 20% of the production speed of the production machine 1 for producing the single-sided laminated corrugated cardboard web.

Because of the difference in speeds between the conveyor belt for conveying the single-sided laminated corrugated cardboard web and the production machine 1 for producing the single-sided laminated corrugated cardboard web, the defective piece 111 of the single-sided laminated corrugated cardboard web 11, which has not yet run through the clamping and cutting unit 5, is left on the conveyor belt for conveying the single-sided laminated corrugated cardboard web where it forms a loop, wherein the defective piece 111 is stored; whereas the usable piece 110, which ran through the clamping and cutting unit 5 already, runs through the movable cardboard storage carriage unit 4 and is transported onward by the conveyor belt system 8.

The usable piece 110 is conveyed by the conveyor belt system 8 until its end reaches the cardboard storage carriage unit 4, it is secured to the latter and it is lifted off the conveyor belt system 8.

Then the control system changes the conveying direction of the conveyor belt system 8 and simultaneously releases the clamping and cutting unit 5. The defective piece 111 of the single-sided laminated corrugated cardboard web which has remained on the conveyor belt for conveying the single-sided laminated corrugated cardboard web moves forward with the conveyor belt for conveying the single-sided laminated corrugated cardboard web.

Because of the change in the conveying direction of the conveyor belt system 8, the defective piece 111 of the single-sided laminated corrugated cardboard web is conveyed to the position of the flap 7 and is transported through the opening to the waste cardboard collecting carriage 9 which is arranged under the opening. At this point, the flap 7 is in its open position so that the defective piece 111 is able to pass through the opening 207.

After the entire defective piece 111 of the single-sided laminated corrugated cardboard web has gone through the clamping and cutting unit 5, the control system starts up the clamping and cutting unit 5 again in order to\ cut off the single-sided laminated corrugated cardboard web 11, and, after the defective piece 111 has been ejected into the waste cardboard collecting carriage 9, the control system finally changes the conveying direction of the conveyor belt system 8 again, and the usable single-sided laminated corrugated cardboard web 11 is released from the production machine 1 for producing the single-sided laminated corrugated cardboard web by the clamping and cutting unit 5, transported by the movable cardboard storage carriage unit 4 and then joined to the earlier usable single-sided laminated corrugated cardboard web 10, and then the movable cardboard storage carriage unit 4 continues on to perform the cardboard storage function.

Before the single-sided laminated corrugated cardboard web 11 is cut by the clamping and cutting unit 5, the single-sided laminated corrugated cardboard web 11 is firmly clamped by the clamping and cutting unit 5. By cutting the single-sided laminated corrugated cardboard web 11, the defective piece 111 is cut out of the single-sided laminated corrugated cardboard web 11.

Figure 6:
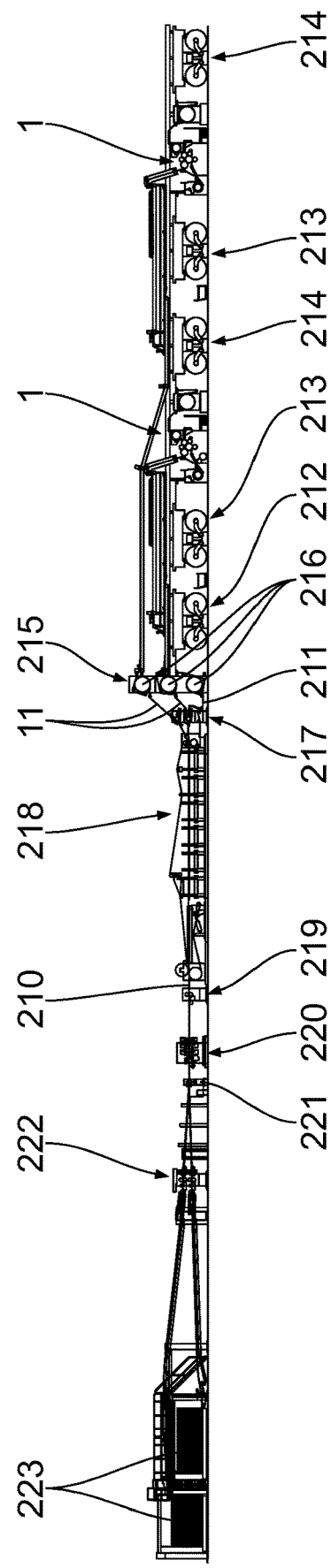
FIG. 6 is a diagrammatic view showing a corrugated cardboard production line with the device for cardboard storage and removal of the present invention.

The corrugated cardboard production line including the device for cardboard storage and removal is described below with reference also to FIG. 6. The corrugated cardboard production line illustrated in FIG. 6 serves to produce a five-layer corrugated cardboard 210 with two single-sided laminated corrugated cardboard webs 11 and a single-layer laminating web 211.

The corrugated cardboard production line has a first splicing device 212 for producing the laminating web 211. To produce the two single-sided laminated corrugated cardboard webs 11, the corrugated cardboard production line has two of the production machines 1 for producing the single-sided laminated corrugated cardboard web.

The first splicing device 212 has a first unrolling unit for unrolling a finite first material web from a first material roll and a second unrolling unit for unrolling a finite second material web from a second material roll. The finite first and second material webs are joined together for producing the continuous laminating web 211 by means of a joining and cutting unit (not shown) of the first splicing device 212.

Each production machine 1 is provided with a second splicing device 213 and a third splicing device 214. Each second splicing device 213 has a third unrolling unit for unrolling a finite third material web from a third material roll and a fourth unrolling unit for unrolling a finite fourth material web from a fourth material roll. The finite third and fourth material webs are each joined together to produce a continuous first material web by means of a joining and cutting unit (not shown) of the second splicing device 213.

Each third splicing device 214 has a fifth unrolling unit for unrolling a finite fifth material web from a fifth material roll and a sixth unrolling unit for unrolling a finite sixth material web from a sixth material roll. The finite fifth and sixth material webs are each joined together to produce a continuous second material web by means of a joining and cutting unit (not shown) of the respective third splicing device 214.

A continuous first material web and a continuous second material web are fed to each production machine 1 for producing a single-sided laminated corrugated cardboard web 11.

Each production machine 1 for producing a single-sided laminated corrugated cardboard web 11 comprises a corrugating roll arrangement with corrugating rolls mounted to rotate for producing a corrugated web with fluting from the continuous first material web. The corrugating rolls form a slit between said rolls to pass through and corrugate the continuous first material web.

In order to adhesively join the corrugated web with the respective continuous second material web to the single-sided laminated corrugated cardboard web 11, each production machine 1 for producing the single-sided laminated corrugated cardboard web has a gluing unit which comprises, in turn, an adhesive metering roll, an adhesive container and an adhesive applicating roll. In order to pass through and apply adhesive to the corrugated web, the adhesive applicating roll forms a gluing slit with the lower corrugating roll, wherein the adhesive applicating roll applies adhesive from the adhesive container to tips of the fluting on the corrugated web. The continuous second material web with the corresponding corrugated web provided with adhesive is then joined to the single-sided laminated corrugated cardboard web 11 in the production machine 1 for producing the single-sided laminated corrugated cardboard web 11.

Each production machine 1 for producing the single-sided laminated corrugated cardboard web 11 has a pressing device for pressing the continuous second material web against the corrugated web provided with adhesive. The pressing device advantageously is designed as a pressure belt module. It presses against the continuous second material web which, in turn, is pressed against the corrugated web provided with adhesive on the corrugated web in contact with the upper corrugating roll.

In order to provide intermediate storage and to buffer the single-sided laminated corrugated cardboard webs 11, these latter are fed through the respective guide frame means 10 of the corresponding device for cardboard storage and removal.

Downstream of the devices for cardboard storage and removal, a preheating device 215 for the corrugated cardboard production line is located, comprising three heated rolls 216 arranged one over the other. The single-sided laminated corrugated cardboard webs 11 and the laminating web 211 are fed to the preheating device 215 and partially wind round the respective heated roll 216.

Downstream of the preheating device 215, the corrugated cardboard production line has a gluing device 217 with two gluing rolls arranged one over the other which are partially immersed in a respective adhesive bath. The single-sided laminated corrugated cardboard webs 11 are situated in contact with the respective gluing roll and are provided with adhesive. Downstream of the gluing device 217, the corrugated cardboard production line has a heat/pressure device 218 in which the single-sided laminated corrugated cardboard webs 11 provided with adhesive and the laminating web 211 are heated and pressed together. For this, the heat/pressure device 218 has a horizontal table provided with heating elements, said table extending in the transportation direction of the single-sided laminated corrugated cardboard webs 11 and the laminating web 211 present there. Above the table, the heat/pressure device 218 has a continuous guided pressure belt. A pressure gap is formed between the pressure belt and the table, through which gap the single-sided laminated corrugated cardboard webs 11 and the laminating web 211 are transported one above the other and where they are pressed together. The multi-layer corrugated cardboard 210 is formed in the heat/pressure device 218.

Downstream of the heat/pressure device 218, the corrugated cardboard production line has a cross-cutting device 219 which serves, for example, to remove splice regions from the corrugated cardboard 210. For this, the cross-cutting device 219 has a cutter bar roll with a cutter and a cutting support associated with the cutter bar roll.

Downstream of the cross-cutting device 219, the corrugated cardboard production line has a longitudinal slitting/scoring device 220, comprising two scoring stations arranged one after the other and two longitudinal slitting stations arranged one after the other. The continuous corrugated cardboard 210 can be divided up into continuous longitudinal corrugated cardboard pieces by the longitudinal slitting stations.

Downstream of the longitudinal slitting/scoring device 220, the corrugated cardboard production line has a switch 221 which comprises a feed table for supplying the continuous corrugated cardboard pieces and a discharge table unit with several discharge tables to take away said pieces at several levels.

Downstream of the switch 221, a second cross-cutting device 222 is provided which has two partial cross-cutting devices arranged one over the other. Each partial cross-cutting device is able to cut the respective continuous corrugated cardboard piece laterally, thus producing sheets of corrugated cardboard.

Downstream of each partial cross-cutting device, a stacking device 223 is arranged to stack the sheets of corrugated cardboard.

Embodiment 2

A device for cardboard storage and removal for a bridge 100 in a corrugated cardboard production line is described below, based on the device already described for cardboard storage and removal for a bridge 100 in a corrugated cardboard production line and referring to FIGS. 7 to 15. Reference will be made to the preceding description.

Compared with the preceding device, the device for cardboard storage and removal for a bridge 100 in a corrugated cardboard production line according to FIGS. 7 to 15 additionally has a splicing device 224, which, in particular, provides for the (semi-)automatic splicing together of usable single-sided laminated corrugated cardboard webs.

The splicing device 224 is advantageously designed as a manual splicing device. It is associated with the first cardboard guide roll 3. The splicing device 224 is telescopic, pivotable and/or hinged. It can be extended or retracted and, in doing so, has a correspondingly displaceable splicing part 230.

The clamping and cutting unit 5 comprises a clamping part 225 and a cutting part 226 arranged after the clamping part 225. The clamping part 225 is designed, for example, as a clamping block. It is displaceable between a clamping position and a released position or, respectively, inactive position relative to the single-sided laminated corrugated cardboard web. The cutting part 226 is designed, for example, as a knife, blade or similar. It is displaceable between a cutting position and an inactive position relative to the single-sided laminated corrugated cardboard web.

Figure 7:
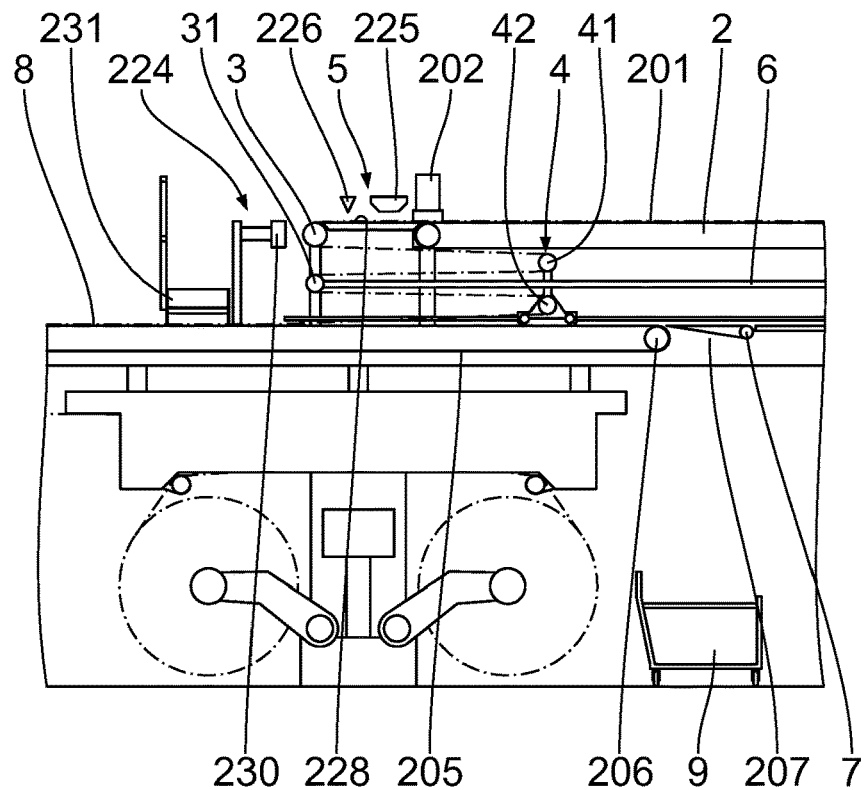
FIG. 7 is a diagrammatic view illustrating a splicing device of a device for cardboard storage and removal shown in FIGS. 1 to 5 for a bridge in a corrugated cardboard production line according to a further embodiment and a splicing process.

According to FIG. 7, the flap 7 is in its closed position so that the opening 207 is closed.

The clamping and cutting unit 5, which includes both the clamping part 225 as well as the cutting part 226, is in its inactive position.

The splicing device 224 is also in its inactive position. There is a gap between the splicing part 230 and the first cardboard guide roll 3.

The conveyor system and the conveyor belt system 8 are operating and are conveying the single-sided laminated corrugated cardboard web.

The cardboard storage carriage unit 4 is in a storage position so that the device for cardboard storage and removal for a bridge 100 in a corrugated cardboard production line has just stored a single-sided laminated corrugated cardboard web 11. The single-sided laminated corrugated cardboard web thus runs around the first cardboard guide roll 3, the first cardboard storage roll 41, the second cardboard guide roll 31 and the second cardboard storage roll 42.

Figure 8:
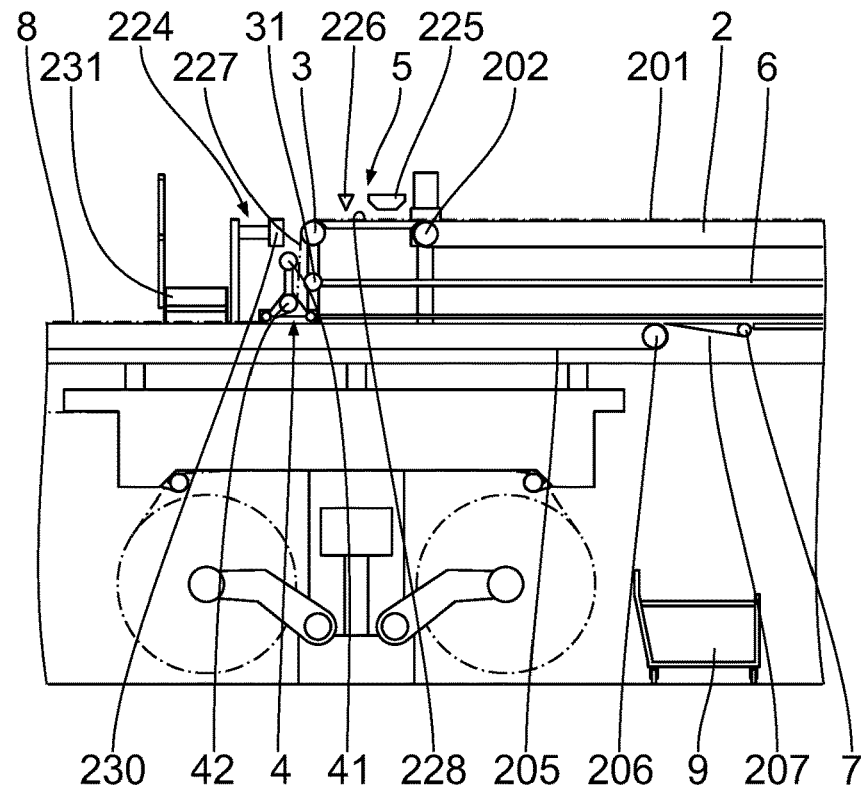
FIG. 8 is a diagrammatic view illustrating a splicing device of a device for cardboard storage and removal shown in FIGS. 1 to 5 for a bridge in a corrugated cardboard production line according to a further embodiment and a splicing process.

If a detection means detects a splicing defect or other defective pieces, as FIG. 8 shows, the cardboard storage carriage unit 4 is now moved from its storage position to its non-storage position, whereby the cardboard storage or supply of single-sided laminated corrugated cardboard web is virtually used up. This is triggered by the control system. The single-sided laminated corrugated cardboard web thus runs around the first cardboard guide roll 3 and the second cardboard storage roll 42.

Figure 9:
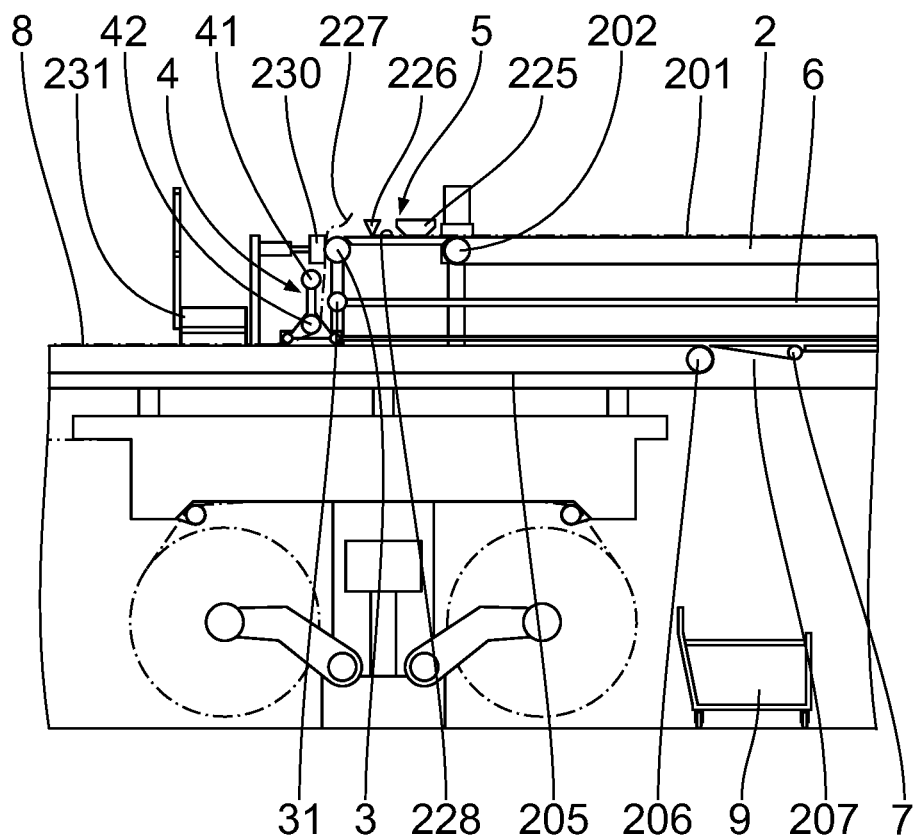
FIG. 9 is a diagrammatic view illustrating a splicing device of a device for cardboard storage and removal shown in FIGS. 1 to 5 for a bridge in a corrugated cardboard production line according to a further embodiment and a splicing process.

In FIG. 9, the conveyor belt system 8 is halted.

The clamping and cutting unit 5 is now situated in its active position. The clamping part 225 presses the single-sided laminated corrugated cardboard web to clamp it while the cutting part 226 cuts the single-sided laminated corrugated cardboard web laterally into a leading piece 227 and a trailing piece 228. The trailing piece 228 is clamped firmly in place by the clamping part 225. The leading piece 227 is held firmly in place by the splicing device 224, whose splicing part 230 has been moved into its clamping position. In particular, the leading piece 227 is a usable piece, whereas the trailing piece 228 is a defective piece.

Figure 10:
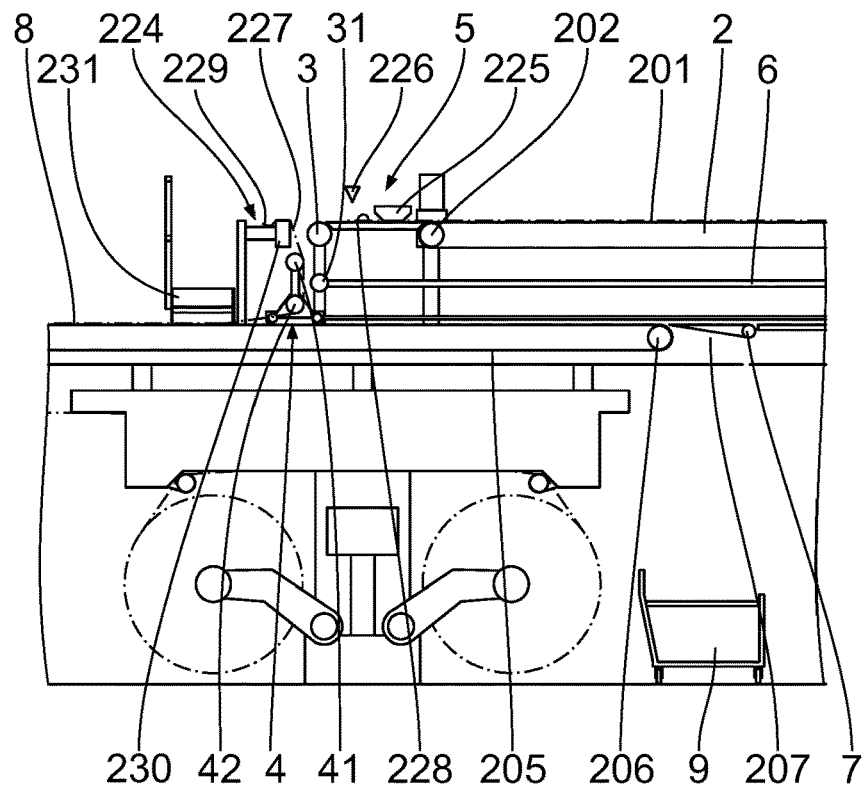
FIG. 10 is a diagrammatic view illustrating a splicing device of a device for cardboard storage and removal shown in FIGS. 1 to 5 for a bridge in a corrugated cardboard production line according to a further embodiment and a splicing process.

As FIG. 10 shows, the cutting part 226 is now moved to its inactive position while the clamping part 225 remains in its clamping position.

The splicing part 230 is again moved to its inactive position where, so to speak, the single-sided laminated corrugated cardboard web or the produced leading piece 227 is released. An adhesive strip (not shown) is applied to the produced leading piece 227 at its downstream end 229. The adhesive strip can be applied mechanically or manually.

Figure 11:
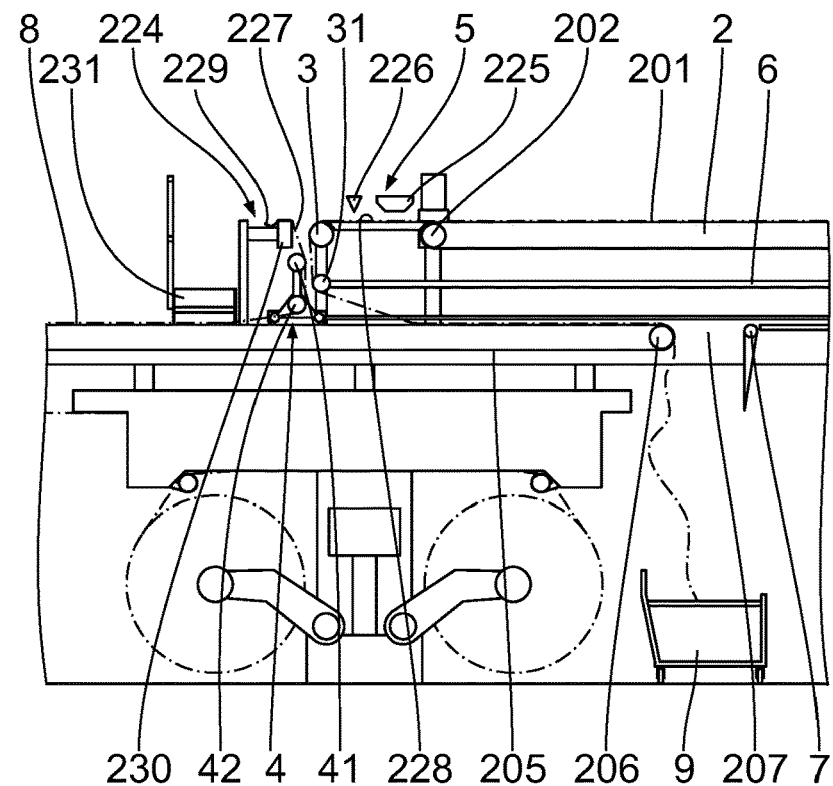
FIG. 11 is a diagrammatic view illustrating a splicing device of a device for cardboard storage and removal shown in FIGS. 1 to 5 for a bridge in a corrugated cardboard production line according to a further embodiment and a splicing process.

As FIG. 11 shows, the flap 7 is next pivoted into its open position so that the opening 207 is opened.

The clamping part 225 is placed in its inactive position so that the trailing piece 228 is again released.

The conveyor belt system 8 is operated such that the trailing piece 228 is conveyed by the conveyor belt system 8 to the opening 207 where it is ejected.

Figure 12:
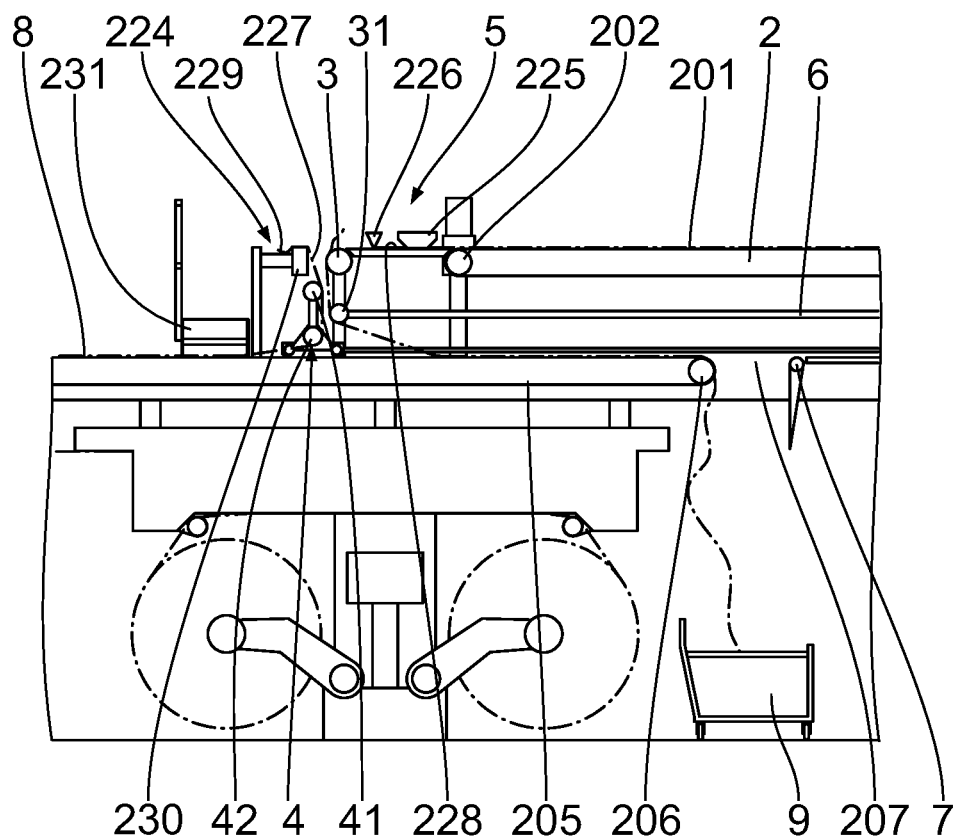
FIG. 12 is a diagrammatic view illustrating a splicing device of a device for cardboard storage and removal shown in FIGS. 1 to 5 for a bridge in a corrugated cardboard production line according to a further embodiment and a splicing process.

As FIG. 12 shows, the clamping part 225 and the cutting part 226 are again placed in their active position so that the trailing piece 228 is clamped and separated. This takes place if the single-sided laminated corrugated cardboard web is again defective. The trailing piece is ejected through the opening 207 and guided into the waste cardboard collecting carriage 9.

Figure 13:
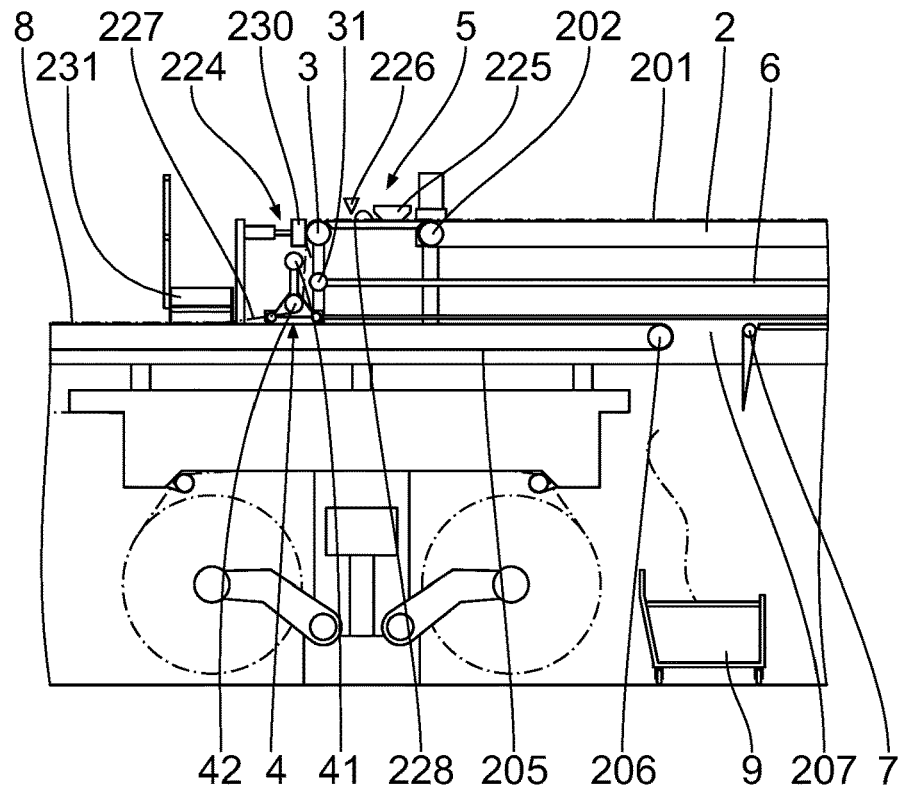
FIG. 13 is a diagrammatic view illustrating a splicing device of a device for cardboard storage and removal shown in FIGS. 1 to 5 for a bridge in a corrugated cardboard production line according to a further embodiment and a splicing process.

As FIG. 13 shows, the cutting part 226 is now placed again in its inactive position. The splicing device 224 is activated again so that the splicing part 230 extends out to a splicing position and the single-sided laminated corrugated cardboard web is pressed against the first cardboard guide roll 3, clamping it. The applied adhesive strip is used to join the leading piece 227 firmly to the single-sided laminated defect-free corrugated cardboard web. In this way, a continuous single-sided laminated defect-free corrugated cardboard web is produced.

Figure 14:
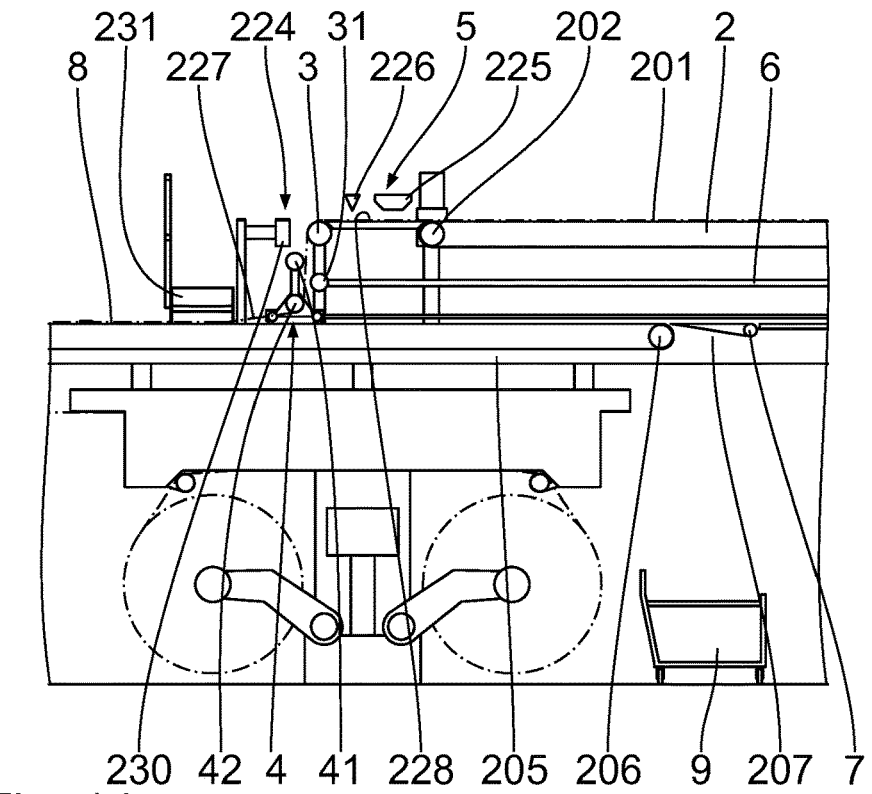
FIG. 14 is a diagrammatic view illustrating a splicing device of a device for cardboard storage and removal shown in FIGS. 1 to 5 for a bridge in a corrugated cardboard production line according to a further embodiment and a splicing process.
Figure 15:
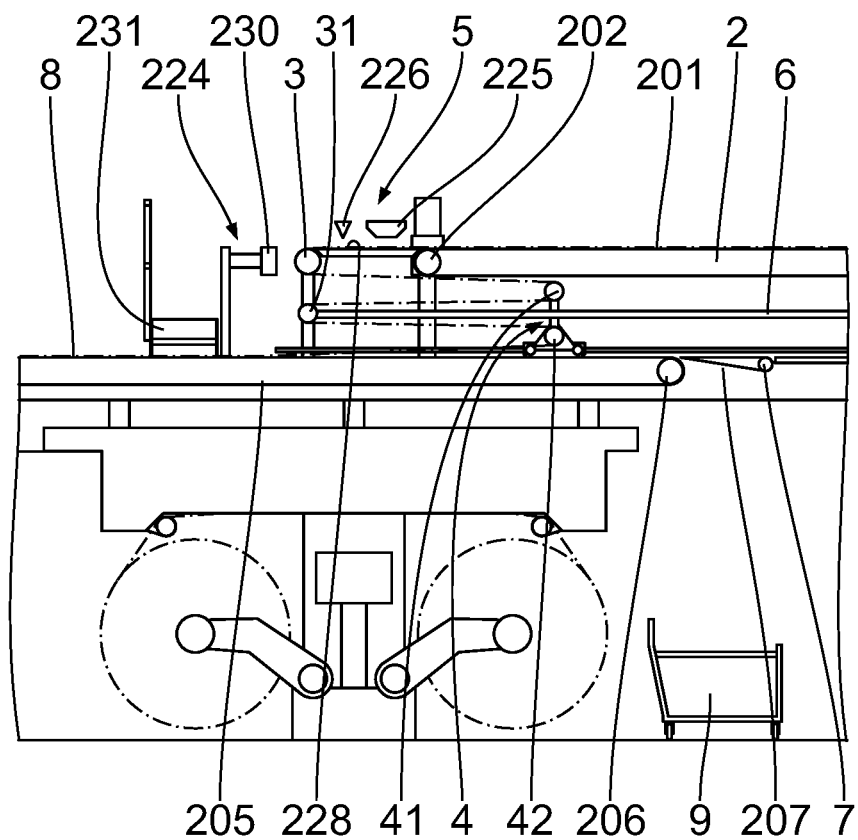
FIG. 15 is a diagrammatic view illustrating a splicing device of a device for cardboard storage and removal shown in FIGS. 1 to 5 for a bridge in a corrugated cardboard production line according to a further embodiment and a splicing process.

As FIG. 14 shows, the flap 7 is now pivoted into its closed position so that the opening 207 is now closed. The splicing part 230 is placed again in its inactive position. Furthermore, the clamping part 225 is placed in its inactive position. The conveyor belt system 8 is operated again so that the single-sided laminated corrugated cardboard web is transported away from the flap 7.

Then, the cardboard storage carriage unit 4 is moved to a storage position so that a supply of single-sided laminated corrugated cardboard web 11 is created.

The described ejection or splicing steps are brought about, in particular, by the control system.

A catwalk 231 extends, or ends, next to the splicing device so that a worker can reach the splicing device 224 easily and can carry out required manual steps there, for example.

While specific embodiments of the invention have been shown and described in detail to illustrate the application of the principles of the invention, it will be understood that the invention may be embodied otherwise without departing from such principles.

The invention claimed is:

1. A device for cardboard storage and removal for a bridge in a corrugated cardboard production line, the device comprising:
   a bridge structure with a planar surface on an upper side;
   a conveyor system for conveying a single-sided laminated corrugated cardboard web arranged above the bridge structure, said conveyor system comprising a conveyor belt, extending parallel to the planar surface, for conveying the single-sided laminated corrugated cardboard web and the conveyor system having an entry end and an exit end where a clamping and cutting unit is provided;
   a first cardboard guide roll and a second cardboard guide roll arranged with a vertical gap between the first cardboard guide roll and the second cardboard guide roll, the first cardboard guide roll and the second cardboard guide roll being provided outside of the exit end of the conveyor system for conveying the single-sided laminated corrugated cardboard web;
   a separating plate extending parallel to a direction of travel of the conveyor belt for conveying the single-sided laminated corrugated cardboard web, the separating plate being provided below the conveyor system for conveying the single-sided laminated corrugated cardboard web;
   a movable cardboard storage carriage unit provided on the bridge structure under the conveyor system for conveying the single-sided laminated corrugated cardboard web, wherein the movable cardboard storage carriage unit and the bridge structure form a sliding pair; and
   a drive system connected to the movable cardboard storage carriage unit, which comprises a first cardboard storage roll and a second cardboard storage roll, wherein a vertical gap is provided between the first cardboard storage roll and the second cardboard storage roll, the first cardboard guide roll, the first cardboard storage roll, the second cardboard guide roll and the second cardboard storage roll being arranged one after another along a vertical direction with a vertical gap between each of the first cardboard guide roll, the first cardboard storage roll, the second cardboard guide roll and the second cardboard storage roll;
   a conveyor belt system provided in the bridge structure under the movable cardboard storage carriage unit, wherein an opening is provided in the bridge structure adjacent to one end of the conveyor belt system, and a flap provided in the opening, wherein a waste cardboard collecting carriage is provided under the flap.

2. A device for cardboard storage and removal for the bridge in the corrugated cardboard production line according to claim 1, wherein the conveyor belt system comprises a forward and reverse drive system.

3. A device for cardboard storage and removal for the bridge in the corrugated cardboard production line according to claim 1, wherein the first cardboard guide roll and the second cardboard guide roll are stationary rotatably mounted.

4. A device for cardboard storage and removal for the bridge in the corrugated cardboard production line according to claim 1, wherein the first cardboard guide roll is arranged essentially at a height of the conveyor system.

5. A device for cardboard storage and removal for the bridge in the corrugated cardboard production line according to claim 1, wherein the second cardboard guide roll is arranged essentially at a height of the separating plate.

6. A device for cardboard storage and removal for the bridge in the corrugated cardboard production according to claim 1, wherein the conveyor belt system conveys usable single-sided laminated corrugated cardboard web.

7. A device for cardboard storage and removal for the bridge in the corrugated cardboard production line according to claim 1, wherein, after a change in a conveying direction of the conveyor belt system, the conveyor belt system transports a detected defective piece of the single-sided laminated corrugated cardboard web to one of the opening and the flap.

8. A device for cardboard storage and removal for the bridge in the corrugated cardboard production line according to claim 7, wherein the clamping and cutting unit cuts the detected defective piece of the single-sided laminated corrugated cardboard web out of the single-sided laminated corrugated cardboard web.

9. A device for cardboard storage and removal for the bridge in the corrugated cardboard production line according to claim 1, further comprising:
   a splicing device for joining usable single-sided laminated corrugated cardboard webs together.

10. A device for cardboard storage and removal for the bridge in the corrugated cardboard production line according to claim 9, wherein the splicing device is displaceable between an active splicing position and an inactive position, wherein, in the active splicing position, at least one of the usable single-sided laminated corrugated cardboard webs is halted for splicing.

11. A method for cardboard storage and removal for a bridge in a corrugated cardboard production line, the method comprising:
   providing a device comprising a bridge structure with a planar surface on an upper side, a conveyor system for conveying a single-sided laminated corrugated cardboard web arranged above the bridge structure, a first cardboard guide roll and a second cardboard guide roll, a separating plate, a movable cardboard storage carriage unit provided on the bridge structure under the conveyor system for conveying the single-sided laminated corrugated cardboard web, a drive system connected to the movable cardboard storage carriage unit and a conveyor belt system provided in the bridge structure under the movable cardboard storage carriage unit, said movable cardboard storage carriage unit and said bridge structure forming a sliding pair, said conveyor system comprising a conveyor belt, extending parallel to the planar surface for conveying the single-sided laminated corrugated cardboard web and the conveyor system having an entry end and an exit end where a clamping and cutting unit is provided, wherein a vertical gap is provided between the first cardboard guide roll and the second cardboard guide roll, the first cardboard guide roll and the second cardboard guide roll being provided outside of the exit end of the conveyor system for conveying the single-sided laminated corrugated cardboard web, the separating plate extending parallel to a direction of travel of the conveyor belt for conveying the single-sided laminated corrugated cardboard web, the separating plate being provided below the conveyor system for conveying the single-sided laminated corrugated cardboard web, the drive system comprising a first cardboard storage roll and a second cardboard storage roll, wherein a vertical gap is provided between the first cardboard storage roll and the second cardboard storage roll, the first cardboard guide roll, the first cardboard storage roll, the second cardboard guide roll and the second cardboard storage roll being arranged one after another along a vertical direction with a vertical gap between each of the first cardboard guide roll, the first cardboard storage roll, the second cardboard guide roll and the second cardboard storage roll, wherein an opening is provided in the bridge structure adjacent to one end of the conveyor belt system, and a flap is provided in the opening, wherein a waste cardboard collecting carriage is provided under the flap.

* * * * *